United States Patent
Yu et al.

(10) Patent No.: US 12,339,293 B2
(45) Date of Patent: Jun. 24, 2025

(54) IDENTIFYING SUBSTRATE WASTE SITES

(71) Applicant: HEWLETT-PACKARD DEVELOPMENT COMPANY, L.P., Spring, TX (US)

(72) Inventors: Joshua M. Yu, Corvallis, OR (US); Angela Bakkom, Corvallis, OR (US); Christopher Hans Bakker, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 681 days.

(21) Appl. No.: 17/669,485

(22) Filed: Feb. 11, 2022

(65) Prior Publication Data

US 2023/0258678 A1    Aug. 17, 2023

(51) Int. Cl.

| | |
|---|---|
| *B01L 3/00* | (2006.01) |
| *A61B 6/00* | (2024.01) |
| *A61B 8/00* | (2006.01) |
| *B01F 23/00* | (2022.01) |
| *B01F 23/41* | (2022.01) |
| *B01F 101/23* | (2022.01) |
| *B23Q 17/24* | (2006.01) |
| *C07K 14/705* | (2006.01) |
| *C12M 1/34* | (2006.01) |
| *C12Q 1/04* | (2006.01) |
| *C12Q 1/18* | (2006.01) |

(Continued)

(52) U.S. Cl.
CPC .............. *G01N 35/1011* (2013.01); *G01N 2015/1028* (2024.01)

(58) Field of Classification Search
CPC ....... G01N 35/1011; G01N 2015/1028; G01N 15/1433; G01N 15/1023; G01N 15/1484; G01N 15/149; G01N 2015/0294; G01N 2015/1029; G01N 2015/103; G01N 15/0227; G01N 2015/1493; G01N 2015/1497; G01N 15/1031; G01N 2015/1006; G01N 15/1459

See application file for complete search history.

(56) References Cited

U.S. PATENT DOCUMENTS

2015/0253223 A1* 9/2015 Foster .................... G01N 1/31
                                                          435/309.1
2017/0059458 A1* 3/2017 Miltenyi ........... B01L 3/502738

FOREIGN PATENT DOCUMENTS

WO    WO-2020091800    5/2020
WO    WO-2021021071    2/2021

* cited by examiner

*Primary Examiner* — Jennifer Wecker
*Assistant Examiner* — Oyeleye Alexander Alabi
(74) *Attorney, Agent, or Firm* — Foley & Lardner LLP

(57) ABSTRACT

In one example in accordance with the present disclosure, a system is described. The system includes a fluidic die to advance across an ejection path relative to a substrate. The fluidic die includes a channel to contain a portion of a sample fluid, a sensor to detect passage of a particle within the sample fluid into the channel, and an ejection device. The ejection device is to eject the particle. The system also includes a controller. The controller identifies discrete locations along the ejection path as waste sites as the fluidic die advances along the ejection path. This is done by 1) classifying the particle as a target particle or a non-target particle, 2) upon identification of a target particle, ejecting the target particle to a target site of the substrate, and 3) upon identification of a non-target particle, ejecting the non-target particle to a waste site.

6 Claims, 8 Drawing Sheets

(51) Int. Cl.

| | |
|---|---|
| *C12Q 1/686* | (2018.01) |
| *G01N 1/31* | (2006.01) |
| *G01N 15/10* | (2024.01) |
| *G01N 21/3577* | (2014.01) |
| *G01N 21/359* | (2014.01) |
| *G01N 21/39* | (2006.01) |
| *G01N 21/45* | (2006.01) |
| *G01N 21/64* | (2006.01) |
| *G01N 21/77* | (2006.01) |
| *G01N 21/78* | (2006.01) |
| *G01N 27/414* | (2006.01) |
| *G01N 27/62* | (2021.01) |
| *G01N 30/12* | (2006.01) |
| *G01N 30/68* | (2006.01) |
| *G01N 30/70* | (2006.01) |
| *G01N 30/72* | (2006.01) |
| *G01N 30/88* | (2006.01) |
| *G01N 33/00* | (2006.01) |
| *G01N 33/18* | (2006.01) |
| *G01N 33/50* | (2006.01) |
| *G01N 33/53* | (2006.01) |
| *G01N 33/543* | (2006.01) |
| *G01N 33/68* | (2006.01) |
| *G01N 33/74* | (2006.01) |
| *G01N 35/00* | (2006.01) |
| *G01N 35/10* | (2006.01) |
| *G06K 7/10* | (2006.01) |
| *G06K 7/14* | (2006.01) |
| *G06K 19/06* | (2006.01) |
| *G06K 19/07* | (2006.01) |
| *G06T 7/00* | (2017.01) |
| *G06T 7/90* | (2017.01) |
| *G16H 10/40* | (2018.01) |
| *G16H 10/60* | (2018.01) |
| *G16H 30/40* | (2018.01) |
| *G16H 50/20* | (2018.01) |
| *G16H 80/00* | (2018.01) |
| *H01J 49/00* | (2006.01) |
| *H04M 17/00* | (2024.01) |
| *H10K 10/46* | (2023.01) |
| *H10K 85/00* | (2023.01) |
| *H10K 85/20* | (2023.01) |

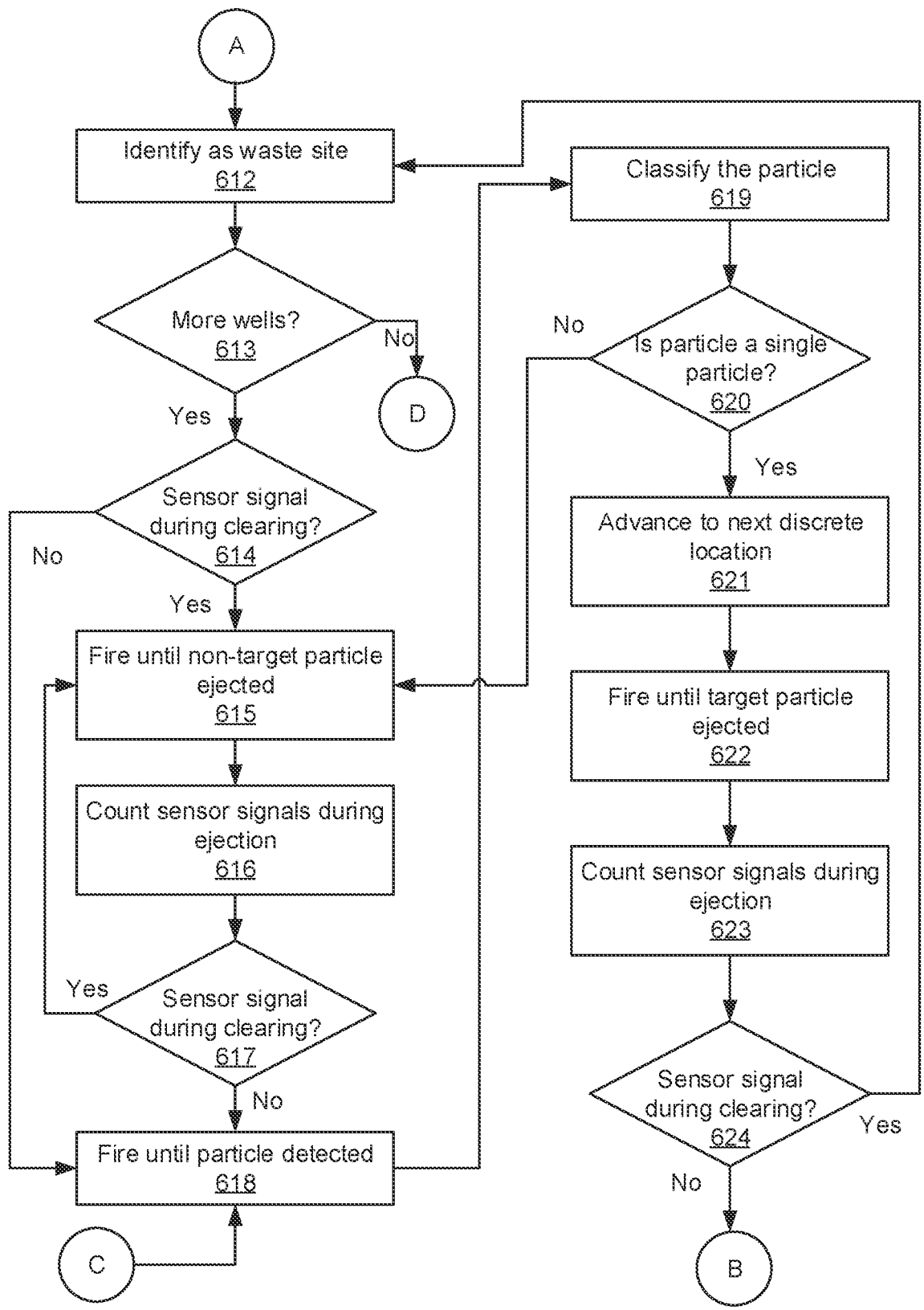
Fig. 6 (contd)

IDENTIFYING SUBSTRATE WASTE SITES

BACKGROUND

An assay is a process used in laboratory medicine, pharmacology, analytical chemistry, environmental biology, and molecular biology to extract, assess, or measure the presence, amount, or functional activity of particles in a sample fluid. The particles to be studied may include a drug, a genomic particle, a proteomic particle, a biochemical substance, a cell of an organism, or any other type of particle.

A wealth of information can be gleaned from the assayed particle. For example, cells may be analyzed to identify certain diseases. Diseases may be studied to identify potential cures and treatments. In general, an assay is carried out by dispensing small amounts of sample fluid into multiple wells of a well plate. The sample fluid in these wells can then be processed and analyzed. Such assays can be used to enable drug discovery as well as facilitate genomic and proteomic research.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
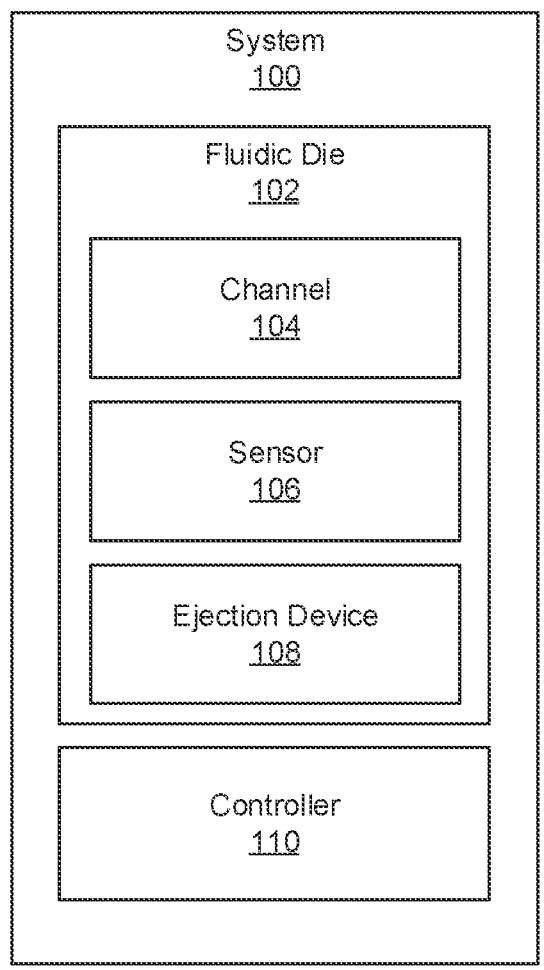
FIG. 1 is a block diagram of a system for fluidic waste site identification, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Scientists may analyze and research the chemical characteristics and processes of particles such as cells, nucleic acids, and other biomolecules contained within a sample fluid. The results of this analysis and research may yield a wealth of information including insight into how living things operate. A greater understanding of the different kinds of particles and their functions can lead to certain technological innovations that benefit society in countless ways. For example, from cells, certain biologics such as proteins, insulin, other therapeutic drugs, ribonucleic acid (RNA), and deoxyribonucleic acid (DNA) may be obtained.

Such insight may also lead to the identification of treatments of certain ailments. The study of a sample fluid from a particular patient may allow identification of a disease that person has contracted such that the patient may be treated and the disease effect reduced or entirely removed in the patient.

While such cellular analysis has undoubtedly advanced our understanding of the operation of molecules, cells, and other particles, the study of these particles continues to be complex and costly such that refinements to cellular processing may enhance the possible uses and reach of cellular analytics. Accordingly, the present specification describes a system that allows for measured and controlled extraction of a target particle from a sample fluid. In one particular example, the system allows for measured and controlled extraction of a single target particle per well of a well plate. Throughout the present specification, the term "particle" may refer to any molecule, cell, bacteria, or organelle while a "target particle" refers to a particle that is of interest, or intended to be studied.

In a specific example, a single target particle or a few target particles are dispensed into wells of a well plate via an assay. Such assays have been performed manually. That is, a user fills sample fluid into a single channel pipette, or a multi-channel pipette, and manually disperses a prescribed amount of sample fluid from the pipette into various wells of a well plate. As this process is done by hand, it is tedious, complex, and inefficient. Moreover, it is prone to error as a user may misalign the pipette with the wells of the well plate and/or may dispense an incorrect amount of fluid. Still further, such manual deposition of sample fluid may be incapable of dispensing low volumes of fluid, for example in the picoliter range.

Accordingly, the present specification describes the digital dispensing of sample fluid to replace manual dispensing methods. In these examples, high precision digital fluid ejection devices which may include fluidic dies, are used. A fluidic die includes a number of nozzles. Each nozzle holds a small volume of sample fluid and an ejection device expels that sample fluid through an opening.

In general, a nozzle includes various components such as an ejection chamber, an opening, and an ejection device. In an example, the ejection device is a firing resistor. The firing resistor heats up in response to an applied voltage. As the firing resistor heats up, a portion of the fluid in an ejection chamber vaporizes to generate a bubble. This bubble pushes fluid out the opening and onto the substrate. As the vaporized fluid bubble pops, fluid is drawn into the ejection chamber from a passage that connects the ejection chamber to a fluid feed slot, and the process repeats. In this example, the fluidic die may be a thermal inkjet (TIJ) fluidic die.

In another example, the ejection device may be a piezoelectric device. As a voltage is applied, the piezoelectric ejection device changes shape which generates a pressure pulse in the ejection chamber that pushes the fluid out the opening and onto the substrate. In this example, the fluidic die may be a piezoelectric inkjet (PIJ) fluidic die.

In operation, the fluidic dies dispense the sample fluid onto a substrate, such as into wells of a well plate positioned below the fluidic dies.

Such digital fluid ejection devices may be microfluidic systems that enable fluid-based experiments to be conducted using much smaller quantities of sample fluid as compared to microtiter plate-based experiments. These small volumes enable a reduction in expensive chemicals used, a reduction in the amount of patient sample fluid used which makes sample fluid collection easier and less intrusive, a reduction in the amount of waste generated, and in some cases a reduction in the time for processing. In some examples, a microfluidic analysis system may dispense micro, pico, or nano-liters of sample fluid into specific locations on a substrate.

When combined with fluidic die that include a sensor in the path of fluid flow from a reservoir to the nozzle, dispensing counted target particles or single target particles from a sample fluid can be achieved by detecting when the target particle moves across the sensor. For example, volumetric dispensing into well plates involves firing into each well with a predetermined number of fire pulses to reach a target volume.

When dispensing a predetermined number of target particles, as opposed to a predetermined volume of sample fluid, a similar approach is utilized. That is, in some examples, rather than depositing a predetermined volume of sample fluid, a user may desire to dispense a predetermined number of target particles in a well. In this example, ejection devices are activated to fire portions of a sample fluid into each well. A sensor detects each target particle as it is ejected. The detection of each target particle increments a count. Once the count reaches the predetermined number, the ejection devices are de-activated.

Such dispense methods are effective when the sample fluid is pristine and does not include non-target particles such as contaminants, clumps, and debris. Non-target particles can trigger the sensor to increment its count, causing the well to be unusable since it does not exclusively contain target particles or does not include the target number of target particles.

Non-target particles are found in many sample fluids. Well occupancy, which is the number of wells with the correct number of target particles relative to the total number of wells dispensed into, decreases when the sample fluid contains non-target particles, such as contaminants, clumps, or debris, since non-target particles can trigger the sensor and are therefore ejected into the well, rendering the unusable. For single target particle dispensing (counted target particle dispensing where the count is 1), occupancy may be less than 70% due to the presence of non-target particles.

In some examples, a substrate may include a waste site where detected non-target particles may be ejected. This method is made possible by using a fluidic die that has the sensor spaced apart from the nozzle. When a particle passes by the sensor, the ejection device is de-activated immediately or after a few pulses to compensate for blowback. That is, in one example, the controller may immediately discontinue transmission of activation pulses such that the ejection device is de-activated immediately after a particle is detected. In another example, instead of stopping immediately, the controller continues to fire a few activation pulses to advance the particle slightly further. This is done to compensate for potential blowback where the fluid may momentarily flow backwards. Firing these additional activation pulses therefore ensures that the particle does not flow back over the sensor and create a false detection event. In either case, the intent is for the particle to remain in the channel between the sensor and the ejection device, so that the particle can be classified as a target or non-target particle before ejection to the target site or waste site, respectively.

As such, the particle remains in a channel between the sensor and the ejection device where it is classified. That is, the sensor signal is evaluated, or a visual image taken, to determine if the particle that triggered the sensor is a single target particle, or a non-target particle. A variety of methods may be used to classify the particle. For example, the system may rely on an impedance/conductivity measurement as described below to classify the particle. For example, particle that triggers a rapid impedance spike may be classified as a target particle (e.g., a single cell). By comparison, a particle that triggers an impedance/conductivity change that is long and drawn-out or oscillating may be classified as a non-target particle (e.g., clumps or debris). In another example, classification may be based on a visual image. In this example, the system includes a camera to take a picture of the particle in the channel and then performing image analysis of the picture to determine if the particle's size and shape are consistent with those of a target particle.

If it is a target particle, then the system aligns the fluidic die to a target site and ejects the particle at the target site. If the particle is a non-target particle, i.e., a non-target particle, then the system remains at the waste site and fires the contents of the channel at the waste site and continues firing until the next particle is detected.

This may increase occupancy as non-target particles are differentiated from target particles. However, throughput decreases as the system changes the alignment of the fluidic die such that the fluidic die alignment changes from being disposed over target sites and predetermined waste sites). Well plate dispense time may be increased on the order of magnitude of 5-7 times when a substrate includes a single predetermined waste site and by 3-4 times when the substrate includes four predetermined waste sites.

Moreover, even when using predetermined waste sites, some wells may still be unusable as a fluidic die with a sensor located away from the nozzle introduces certain variability. For example, after identifying a particle as a target particle to be ejected, the ejection device is activated to draw the target particle, from the channel to the nozzle and to eject the target particle. While clearing the channel of the target particle, a second particle may pass the sensor and enter the channel. This may cause the current target site or a subsequent target site to have an extra particle, rendering the well unusable. In systems that implement predetermined waste sites, entry of a second particle into a channel whilst ejecting a first particle may be accounted for by performing additional bursts into the waste site to ensure the channel is clear before starting ejection for the next target site. However, this further reduces throughput.

Accordingly, the present specification describes methods and systems for increasing occupancy by dynamically allocating and utilizing waste sites during the dispense run, rather than relying on the predetermination of waste sites before a dispense run. Accordingly, when a non-target particle is sensed and dispensed at a discrete location on the substrate, that location becomes a waste site, which then serves as a staging area for the next ejection event, increasing the likelihood of the next location becoming a target site. In an example, subsequent ejection events may utilize this run-identified waste site as a staging area. In other words, the present system operates as if a discrete location is not a waste site, and identifies the location as a waste site once a non-target particle is detected. Locations that are rendered unusable during the dispense run become established as waste sites and added to a running list of waste sites.

The dynamic allocation of waste sites during the dispense run may prioritize occupancy or throughput. In a high-occupancy mode, the system may dispense target particles at different locations along an ejection path until a non-target particle renders a discrete location as a waste site, which location is added to a list of waste sites. For remaining ejections, the system may rely on the waste site, i.e., (burst into a waste site until a target particle is in the channel, then burst towards a target site to clear the channel's contents), using the waste site from the list of waste sites with the shortest total distance from the current position. Whenever a location is rendered unusable, the new location is added to the list of waste sites and the dispense run continues.

However, for some applications, an even higher throughput may be desired. In these scenarios, the system may operate in a high-speed mode. In high-speed mode, target particles are ejected until a non-target particle is detected, at which point the location where the non-target particle is detected is designated as a waste site. The system moves on to the next location along the ejection path and continues to eject target particles along the ejection path until another non-target particle is detected. In other words, in the high-speed mode, a waste site is dynamically determined whenever a non-target particle is detected. In this example however, the system does not change the alignment of the fluidic die to a closest waste site when a second non-particle is detected, but rather designates another waste site when the second non-particle is detected.

In summary, while dispensing of counted target particles may be effective and quick, occupancy may be low depending on the quality of the sample fluid. For single target particle dispensing, occupancy may be enhanced using static or predetermined waste site dispensing. However, throughput is negatively affected and fewer discrete locations, e.g., wells, are available to receive target particles as some of the discrete locations are identified as waste sites. Waste site dispensing of the present specification provides increased throughput while maintaining high occupancy, by allocating wells as waste sites during the dispense run, rather than relying on static predetermination before a dispense run.

As the present specification enhances throughput and ensures a desired quantity of target particles at each location on the substrate, there can be greater confidence in the outcome of any subsequent operation. That is, the present specification reduces the unknowns from a starting population such that a scientist may more accurately carry out subsequent chemical operations and study.

Specifically, the present specification describes a system. The system includes a fluidic die to advance along an ejection path relative to a substrate. The fluidic die includes a channel to contain a portion of a sample fluid, a sensor to detect passage of a target particle within the sample fluid into the channel, and an ejection device to eject the target particle. The system also includes a controller. The controller is to identify, as the fluidic die advances along the ejection path, discrete locations along the ejection path as waste sites. This is done by classifying a particle as a target particle or a non-target particle. Upon identification of a target particle, the target particle is ejected to a target site of the substrate. Upon identification of a non-target particle, the non-target particle is ejected to a waste site. In a specific example, the target particles within the sample fluid that are to be ejected are cells. In an example, the ejection device is to transmit a predetermined number of pulses following sensing of a particle.

In an example, the controller is to identify a first waste site based on a detected non-target particle in the channel. The controller may identify additional waste sites based on a detected second particle as a first target particle is passing through the channel. Upon identification of the non-target particle, the controller may determine a closest waste site to a current position of the fluidic die and eject the non-target particle into the closest waste site. In this example, the system includes a database to store a location of the first waste site, additional waste sites, and a current position of the fluidic die.

In an example, detection and classification of a particle occur prior to advancing to a subsequent discrete location. In another example, detection and classification of a particle occur following advancement to a subsequent discrete location.

In an example, i.e., a high-speed mode example, upon identification of the non-target particle, the controller is to 1) designate a location of the substrate over which the fluidic die is found as the waste site; 2) eject the non-target particle; and 3) align the fluidic die with a subsequent discrete location along the ejection path. In this same example, upon identification of the target particle, the controller is to 1) designate a location of the substrate over which the fluidic die is found as a target site; 2) eject the target particle; and 3) advance the fluidic die to a subsequent discrete location along the ejection path.

The present specification also describes a method. According to the method, a fluidic die is incrementally advanced along an ejection path over a substrate. A presence of a particle is detected within a channel, and the particle is classified as a target particle or a non-target particle. As the fluidic die advances along the ejection path, discrete locations along the ejection path are identified as waste sites, wherein a waste site is associated with a non-target particle being detected within the channel of the fluidic die. Responsive to identification of a target particle, the target particle is ejected onto a target site on the substrate. Responsive to identification of a non-target particle, the non-target particle is ejected onto to the waste site.

In an example, i.e., a high-occupancy mode example, a first waste site is identified based on a detected non-target particle in the channel. A second waste site is identified based on a detected second particle as a first target particle is passing through the channel. Responsive to detecting a subsequent non-target particle, the subsequent non-target particle is ejected into a closest waste site of the first waste site and the second waste site.

In an example, classification of the particle occurs while the fluidic die is over the closest waste site. In this example, following ejection of a target particle, the fluidic die is aligned with the closest waste site, ejection pulses are fired until a subsequent particle is detected, and the subsequent particle is classified as a target particle or a non-target particle. Responsive to identification of the subsequent particle as a target particle, the fluidic die is moved to a subsequent discrete location and the subsequent particle is ejected at the subsequent discrete location. Responsive to identification of the subsequent particle as a non-target particle, the fluidic die is maintained at the closest waste site and the subsequent particle is ejected at the closest waste site.

In an example, classification of the particle occurs following ejection to a target site, at the target site. In this example, following ejection of a target particle, the fluidic die is maintained at a current position while, ejection pulses are fired until a subsequent particle is detected and the subsequent particle is classified as a target particle or a non-target particle. Responsive to identification of the subsequent particle as a target particle 1) the fluidic die is aligned with a subsequent discrete location and 2) the target particle is ejected at the subsequent discrete location. Responsive to identification of the subsequent particle as a non-target particle, 1) the fluidic die is aligned with the closest waste site and 2) the non-target particle is ejected.

In an example, classification of the particle occurs following ejection to a target site, at a next discrete location along the ejection path. In this example, following ejection of a target particle, the fluidic die is aligned with a subsequent discrete location, ejection pulses are fired until a subsequent particle is detected, and the subsequent particle is classified as a target particle or a non-target particle. Responsive to identification of the subsequent particle as a target particle, the target particle is ejected at the subsequent discrete location. Responsive to identification of the subsequent particle as a non-target particle, 1) the fluidic die is aligned with the closest waste site and 2) the non-target particle is ejected.

In an example, i.e., a high-speed mode example, upon identification of the non-target particle, 1) a location of the substrate over which the fluidic die is found is designated as the waste site; 2) the non-target particle is ejected; and 3) the fluidic die is advanced to a subsequent discrete location along the ejection path. Upon identification of a target particle, 1) a location of the substrate over which the fluidic die is found is designated as a target site; 2) the target particle is ejected; and 3) the fluidic die is advanced to a subsequent discrete location along the ejection path.

In an example, following ejection of a non-target particle, ejection pulses are fired until a sensor detects a subsequent particle and a subsequent particle is classified as a target particle or a non-target particle. In this example, responsive to identification of the subsequent particle as a target particle, the fluidic die is aligned with a subsequent discrete location. Responsive to identification of the subsequent particle as a non-target particle, the non-target particle is ejected to the waste site.

The present specification also describes a non-transitory machine-readable storage medium encoded with instructions executable by a processor. The machine-readable storage medium includes instructions to 1) incrementally advance a fluidic die along an ejection path relative to a well plate comprising a number of wells, 2) detect a presence of a particle within the channel, and 3) classify the particle as a target particle or a non-target particle. As the fluidic die advances along the ejection path, the instructions are executable to 1) identify a first well as a first waste site based on a non-target particle in the channel and 2) identify a second well as a second waste site based on a sensed second particle as a first target particle is passing through the channel. Responsive to identification of a target particle, the instructions are executable by the processor to cause the ejection device to eject the target particle onto a target well on the well plate. Responsive to identification of a non-target particle, the instructions are executable by the processor to 1) determine a closest waste site of the first waste site and the second waste site and 2) eject the non-target particle to the closest waste site.

In an example, a single target particle is ejected into each target well. In an example, the particle is classified based on an output of an impedance sensor.

Note that while the present specification describes cells as a particular type of target particle, the present systems and methods may target and eject other types of target particles including beads of various materials such as metal and latex, DNA-functionalized beads, and other microspheres. That is, while target particles may be of a wide-variety of types, in one specific example, the target particles are cells.

Note that throughout the specification, while specific reference is made to deposition of sample fluid into wells of a well plate, the present systems and devices can be used to deposit sample fluid on other target surfaces such as microscope slides, matrix assisted laser desorption/ionization (MALDI) plates, petri dishes, and microfluidic chips among other substrates or surfaces. In the later examples, the substrate may include a fixture that fits into the corner ribs and the clamp and retains the target surface.

In summary, using such a particle dispensing system 1) provides highly accurate particle separation; 2) allocates waste sites during the run and on demand so as to increase the number of usable wells, 3) allocates a quantity of waste sites commensurate with the quality of the sample fluid; 4) increases throughput by identifying a closest waste site into which non-target particles are ejected; 5) provides for the rapid generation of many singulated particles; and 6) avoids separate verification tools/operations. However, the devices disclosed herein may address other matters and deficiencies in a number of technical areas. However, the devices disclosed herein may address other matters and deficiencies in a number of technical areas.

As used in the present specification and in the appended claims, the term "fluidic die" refers to a component of a system that ejects sample fluid and includes a number of ejection devices.

Accordingly, as used in the present specification and in the appended claims, the term "ejection device" refers to an individual component of a fluidic die that ejects fluid.

Further, as used in the present specification and in the appended claims, the term "particle" may refer to any molecule, cell, bacteria, or organelle of interest. Before a particle, compound, or other chemical structure can be studied, it is first extracted from a sample fluid and concentrated into an amount that can be effectively studied.

Further, as used in the present specification and in the appended claims, the term "ejection path" refers to a path of discrete locations on a substrate where particle ejection is to occur. "Advancing the fluidic die along the ejection path" refers to the sequential change of the alignment of the fluidic die and the substrate based on the path of discrete locations. In some examples, this re-alignment is effectuated via movement of a fluidic die over a stationary substrate. In other examples, the re-alignment is effectuated via movement of the substrate under a stationary fluidic die.

Turning now to the figures, FIG. 1 is a block diagram of a system (100) for fluidic waste site identification, according to an example of the principles described herein. As described above, the present system (100) ensures that particles classified and identified as non-target particles are disposed at dynamically determined waste sites, rather than in wells that are locations where a target particle is ejected.

The system (100) is a collection of components to perform such dynamic waste site allocation and ejection of target particles at target sites. In some examples, the system (100) is a microfluidic structure. In other words, the components, i.e., the channel (102), sensor (106), and ejection device (108) may be microfluidic structures. A microfluidic structure is a structure of sufficiently small size (e.g., of nanometer sized scale, micrometer sized scale, millimeter sized scale, etc.) to facilitate conveyance of small volumes of fluid (e.g., picoliter scale, nanoliter scale, microliter scale, milliliter scale, etc.).

Such a system (100) may be used in titration processes, compound secondary screening, enzyme profiling, and polymerase chain reactions (PCR), among other chemical and biochemical reactions. Other examples of applications where such a system is used include dose-response titrations, polymerase chain reaction (PCR) miniaturization, microarray printing, drug-drug combination testing, drug repurposing, drug metabolism and pharmacokinetics (DMPK) dispensing and a wide variety of other life science dispensing. While particular reference is made to particular applications, the fluid ejection system can be used in a variety of applications.

A variety of fluids may be deposited. For example, the system (100) may be implemented in a laboratory and may eject biological sample fluid. The sample fluid dispensed by the fluid ejection system may be of a variety of types and may be used for a variety of applications. In some examples, the sample fluid may include solvent or aqueous-based pharmaceutical compounds, as well as aqueous-based biomolecules including proteins, enzymes, lipids, antibiotics, mastermix, primer, DNA samples, cells, or blood components, all with or without additives, such as surfactants or glycerol. To eject the sample fluid, the controller (110) passes control signals and routes them to ejection devices of the fluid ejection system.

As described above, the system (100) is used to deposit target particles onto a substrate. The substrate may be any material on which the target particles may be dispensed. In one example, the substrate may be a well plate with a number of wells in an array and the sample fluid may be deposited into the individual wells of the well plate. While specific reference is made to deposition of sample fluid into wells of a well plate, the present systems and devices can be used to deposit sample fluid on other substrates or surfaces such as microscope slides, matrix assisted laser desorption/ionization (MALDI) plates, and microfluidic chips among other substrates or surfaces.

The system (100) includes a fluidic die (102) that transports sample fluid from a reservoir and ejects the target particles within the sample fluid onto a substrate. In an example, the fluidic die (102) includes a substrate such as a silicon material in which certain components are found.

The fluidic die (102) includes a channel (104) to contain a portion of a sample fluid. The sample fluid may include target particles that are to be separated. That is, it may be desired that a single target particle, such as a single cell, is ejected into teach target well of a well plate. For example, the sample fluid may be a solution that includes biomolecules such as DNA or RNA. A scientist may desire to separate the DNA or RNA from the carrier fluid such that the DNA or RNA may be studied, processed, or otherwise acted upon. As one specific example, PCR is an operation wherein millions or billions of copies of a specific DNA sample are replicated. However, prior to PCR, the DNA in a given sample fluid may be separated and concentrated via the system (100) to enhance PCR efficacy.

The channel (104) may fluidically connect a reservoir to the nozzle through which the target particle is ejected. Accordingly, the channel (104) may include a fluidic input that may receive a sample fluid. The sample fluid flows through the aperture and into the channel (104).

In some examples, the fluid flow through the channel (104) may be generated by a pump that is disposed upstream or downstream from the channel (104). In one particular example, the ejection device (108) generates a negative pressure that draws sample fluid through the channel (104) towards the ejection device (108). The pump and/or ejection device (108) may be integrated into a wall of the channel (104). In some examples, the pump and/or ejection device (108) may be inertial which refers to a component which is in an asymmetric position within the channel (104). In some examples, the pump and/or ejection device (108) may be a thermal inkjet resistor, or a piezo-drive membrane or any other displacement device.

The fluidic die (102) also includes a sensor (106) to detect passage of a particle within the sample fluid into the channel (104). As described above, the output of this sensor (106) may be used to trigger the ejection device (108) to expel the contents of the channel (104). For example, the sample fluid may include target particles dispersed in a liquid carrier fluid. Accordingly, the sensor (106) detects when a target particle passes the sensor (106) into the channel (104) and therefore is along the path towards the ejection device (108) for expulsion onto the substrate.

In one particular example, the sensor (106) is an impedance sensor. Specifically, the sensor (106) may include at least one pair of electrodes spaced apart from one another by a gap. These electrodes detect a level of conductivity within the gap. That is, carrier fluid in which particles are contained, has a predetermined electrical conductivity. Any change to the sample fluid between the electrodes will effectively change the electrical conductivity. Specifically, as the particles pass between the electrodes, the conductivity between the electrodes changes as compared to when just carrier fluid was present between the electrodes. Accordingly, an impedance sensor (106) can differentiate carrier fluid from particles in the carrier fluid.

In another example, different particles may have different electrical conductivity. An impedance sensor (106) can detect the different electrical conductivity and distinguish the particles accordingly. The impedance sensor (106) can also differentiate target particles from non-target particles based on the signature of the sensor (106) output. For example, a target particle may have a first impedance value that is measured by the sensor (106) while a non-target particle such as debris or a contaminant particle may have a second impedance value. Accordingly, the particle is classified as a target particle or a non-target particle based on an output of the impedance sensor (106).

While particular reference is made to an impedance sensor (106) which classifies particles based on an electrical signal, the sensor (106) may discriminate particles based on other criteria such as particle size, color, fluorescence, and scattering response, among others.

The fluidic die (102) may also include an ejection device (108) to eject the amount of fluid, and corresponding target particle, from the channel (104). That is, the system (100) may hold the ejection devices (108) above a surface onto which a target particle is to be ejected. As a specific example, the system (100) may form part of a fluid analysis system that includes a stage to hold and move a well plate.

The ejection device (108) may include a firing resistor or other thermal device, a piezoelectric element, or other mechanism for ejecting particles from the firing chamber. For example, the ejection device (108) may be a firing resistor. The firing resistor heats up in response to an applied voltage. As the firing resistor heats up, a portion of the sample fluid adjacent the firing resistor vaporizes to form a bubble. This bubble pushes the particle out an orifice and onto a surface such as a micro-well plate. As the vaporized fluid bubble collapses, a vacuum pressure along with capillary force draws additional sample fluid towards into the channel (104) from an inlet towards the ejection device (108), and the process repeats. In this example, the ejection device (108) may be a thermal inkjet ejection device.

In another example, the ejection device (108) may be a piezoelectric device. As a voltage is applied, the piezoelectric device changes shape which generates a pressure pulse that pushes a sample fluid out the orifice. In this example, the ejection device (108) may be a piezoelectric inkjet ejection device (108).

In an example, the ejection device (108) and the entire fluidic die (102) may move across a substrate. In another example, the fluidic die (102) is stationary and the substrate moves underneath the fluidic die (102). In either example, an ejection path is followed, which ejection path is made up of an order of discrete locations on the substrate that are subsequently deposited on. An example ejection path is depicted in FIG. 2.

Figure 2:
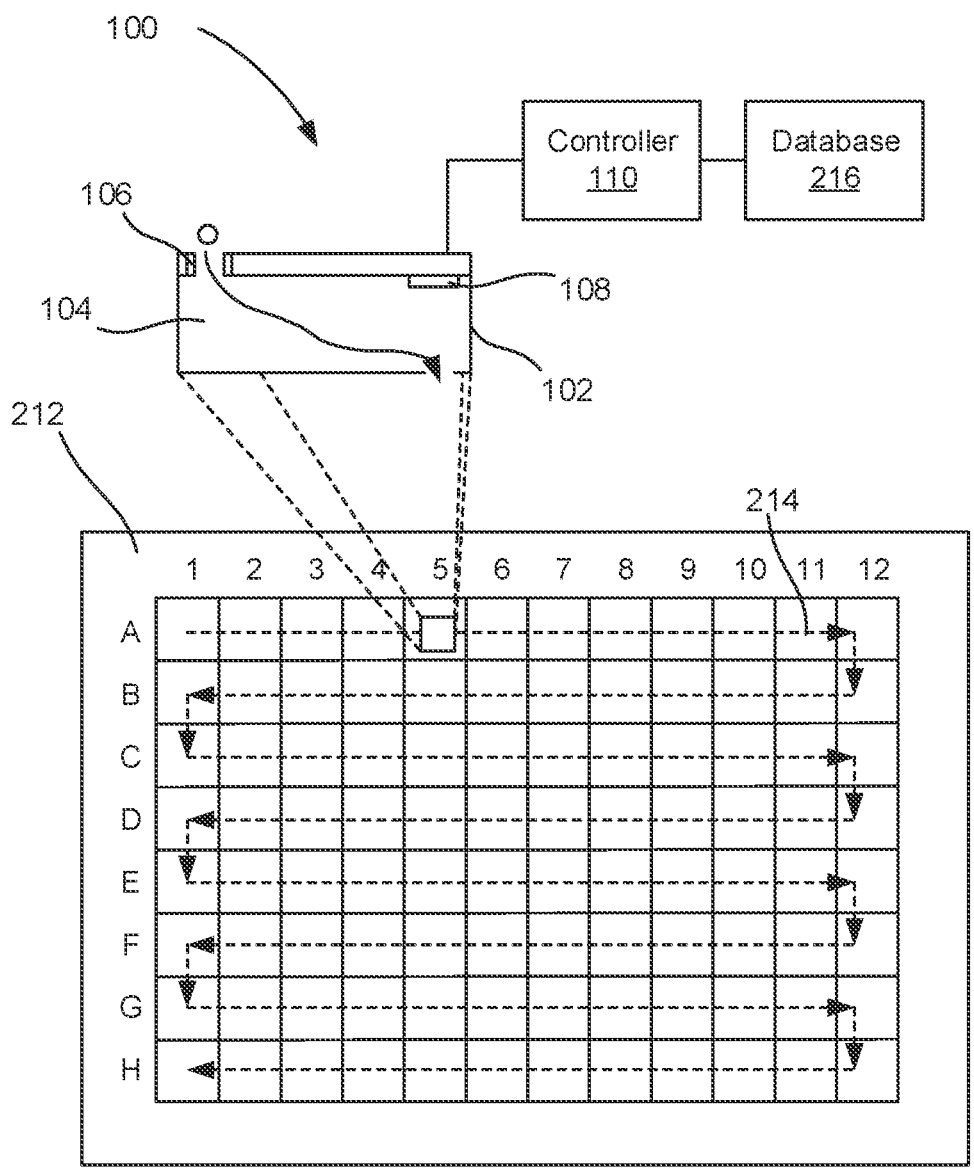
FIG. 2 is a diagram with a well plate passing under the fluidic die to identify fluidic waste sites, according to an example of the principles described herein.

That is, as depicted in FIG. 2, a substrate such as a well plate may include a variety of wells, which in the example depicted in FIG. 2 are square wells. The controller (110), may move the well plate underneath the fluidic die (102) along a predetermined path such that contents of the sample fluid are sequentially ejected into each of the different wells.

In an example, the fluidic die (102) may be separable from the system (100). For example, the system (100) may include a port to receive a number of fluid cartridges, a fluidic die (102) forming part of the fluid cartridge. That is, the fluid cartridges may be removable from the system (100). Accordingly, the system (100) may include a port with an opening into which the fluid cartridge is inserted. In some examples, the port receives multiple fluid cartridges which simultaneously eject sample fluid onto multiple locations of a target substrate. In another example, the port receives a single fluid cartridge. The port may include a mechanism to securely hold the fluid cartridges. The port may also include electrical contacts which mate with corresponding contacts on the fluid cartridges. The signal by which the controller (110) activates the fluid ejection is transmitted from the controller (110) to the fluid cartridges via these electrical contacts.

The fluid cartridges may take a variety of forms. For example, the fluid cartridge may include a reservoir to hold an amount of sample fluid to be ejected. In some examples, the reservoir may be open such that a user may manually insert a sample fluid with target particles into the reservoir, for example via a pipette. As described above, the sample fluid may include a carrier fluid and may also contain target particles that are to be individually ejected. That is, the particles may be suspended in a variety of appropriate fluids. One example of a carrier fluid in which particles are suspended includes a solution of Phosphate Buffered Saline (PBS). Another example may be a solution of particle growth media matched to the particle type.

The system (100) also includes a controller (110) to control operation of the fluidic die (102) and other components of the system (100). For example, the controller (110) may control movement of the substrate with respect to the fluidic die (102). Specifically, the controller (110) may move the substrate to advance the fluidic die (102) along the ejection path. The controller (110) may also deviate from the ejection path, for example to align the fluidic die (102) with a waste site where a non-target particle may be ejected. Accordingly, the system (100) may include motors and other components coupled to the controller (110) and the substrate to effectuate such movement.

The controller (110) may also facilitate the identification of waste sites during the dispense run. Specifically, the controller (110) identifies waste sites along the ejection path, and does so as the fluidic die (102) advances along the ejection path. That is, rather than pre-defining the waste sites statically prior to any dispense run, the current system (100) allows for the runtime identification of waste sites. Doing so may allocate waste sites on an as-needed basis. Moreover, identification of waste sites as discrete locations along the ejection path, rather than some predetermined location to the side or otherwise at a boundary of the ejection region, increases the throughput as the waste sites are closer to the target sites. That is, it would take more time for the controller (110) to align the fluidic die (102) with a non-dispensing region at the periphery of the substrate as compared to aligning the fluidic die (102) with waste sites which are within the dispensing region and dynamically determined.

The controller (110) may do so by classifying a particle that triggers the sensor (106) as a target particle or a non-target particle. That is, as described above, any change to the conductivity of a solution between the electrodes of a sensor (106) may be detected. Both target particles, such as single cells, and non-target particles, such as debris or other contaminants, may alter the conductivity of the solution between the sensor (106) electrodes, albeit to a different degree. Accordingly, the controller (110) may receive an output of the sensor (106). Via a database, lookup table, or other mechanism, the controller (110) may map the received sensor (106) output to a value associated with a target particle or a non-target particle.

Responsive to identification of a target particle, the controller (110) may eject the target particle to a target site of the substrate. That is, each discrete location, or each well of a well plate, may be a potential target site and considered as such until a non-target particle is identified. Ejection of the target particle to a target site may include movement of the substrate or fluidic die (102). For example, upon detection of a first non-target particle, the controller (110) may designate the corresponding location on the substrate as a waste site. The controller (110) may maintain the fluidic die (102) over this location until the sensor (106) detects a target particle. Once the target particle is detected, the controller (110) may move the substrate such that the fluidic die (102) aligns with the next unoccupied well plate along the ejection path and eject the target particle.

Upon identification of a non-target particle, the controller (110) ejects the target particle to a waste site. In some examples, ejection to a waste site may include movement of the substrate while in other examples ejection to a waste site may include maintaining the substrate in its current spot. For example, upon detection of a first non-target particle along an ejection path, the ejection towards the waste site may include maintaining the substrate in its current position and ejecting the non-target particle. In this example, the current position may be designated as a waste site. By comparison, upon detection of a second non-target particle along an ejection path, the ejection towards the waste site may include moving the substrate such that the fluidic die (102) aligns with a closest waste site. Examples of the various scenarios are depicted and described in further detail below.

As such, the present system (100) allows for the ejection of a predetermined amount of contents to target locations. In some examples, the predetermined amount may be a predetermined volume or a predetermined quantity, e.g., one, of the target particles. The system (100) accounts for non-target particles such as contaminants and other debris via the dynamic runtime assignation of waste sites along the ejection path, rather than relying on substrates with predetermined and static waste sites, which predetermined and static waste site usage may reduce throughput and include more waste sites than necessary for a given sample fluid.

The controller (110) may include various hardware components, which may include a processor and memory. The processor may include the hardware architecture to retrieve executable code from the memory and execute the executable code. As specific examples, the controller as described herein may include computer readable storage medium, computer readable storage medium and a processor, an application specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the controller (110), cause the controller (110) to implement at least the functionality of dynamically allocating waste sites during dispense runtime.

FIG. 2 is a diagram with a well plate (212) passing under a fluidic die (102) to identify fluidic waste sites, according to an example of the principles described herein. Note that for simplicity, the components depicted in FIG. 2 are not drawn to scale and are instead enlarged to show detail regarding the specific components. Note also that the ejection path (214) depicted in FIG. 2 depicts the sequence of discrete locations and not necessarily the movement of the substrate.

As described above, the fluidic die (102) may include a channel (104) with an aperture through which a particle, be it a target or non-target particle, is received. As a particle enters the channel (104), the particle passes by a sensor (106) which detects the particle. The output of the sensor (106) is passed to a controller (110) which includes or references a database or other lookup table so as to identify from the sensor (106) output the particle as a non-target or target particle.

FIG. 2 also depicts the ejection path (214). That is, the controller (110) may advance the fluidic die (102) from being disposed above the well "A1" to being above the well "A2" and so on along the ejection path. As described above, this advancement may result from moving the fluidic die (102) over the substrate or moving the substrate underneath the fluidic die (102). A predetermined volume or quantity of target particles is ejected into each well as the fluidic die (102) advances sequentially along the ejection path (214). Once a non-target particle is detected in the channel (104) 1) the current discrete location over which the fluidic die (102) is positioned is identified as a waste site or 2) the fluidic die (102) is aligned with a previously identified waste site, and the non-target particle is ejected.

In an example, the system (100) further includes a database (216) to store a location of waste sites and a current position of the fluidic die (102). That is, as described above, once a waste site is identified, later identified non-target particles may be ejected into any previously identified waste sites. Which of the previously runtime-defined waste sites to which the non-target particle is ejected may be based on distances between the current position of the fluidic die (102) and waste sites. Accordingly, the database (216) may record the locations of the waste sites as well as the current position of the fluidic die (102) such that the controller (110) may identify which waste site is closest to the current position of the fluidic die (102). The waste site that is closest the current position is that waste site to which the fluidic die (102) is directed to eject the corresponding non-target particle. As such, throughput is increased as movement towards a waste site is made more efficient.

Figure 3:
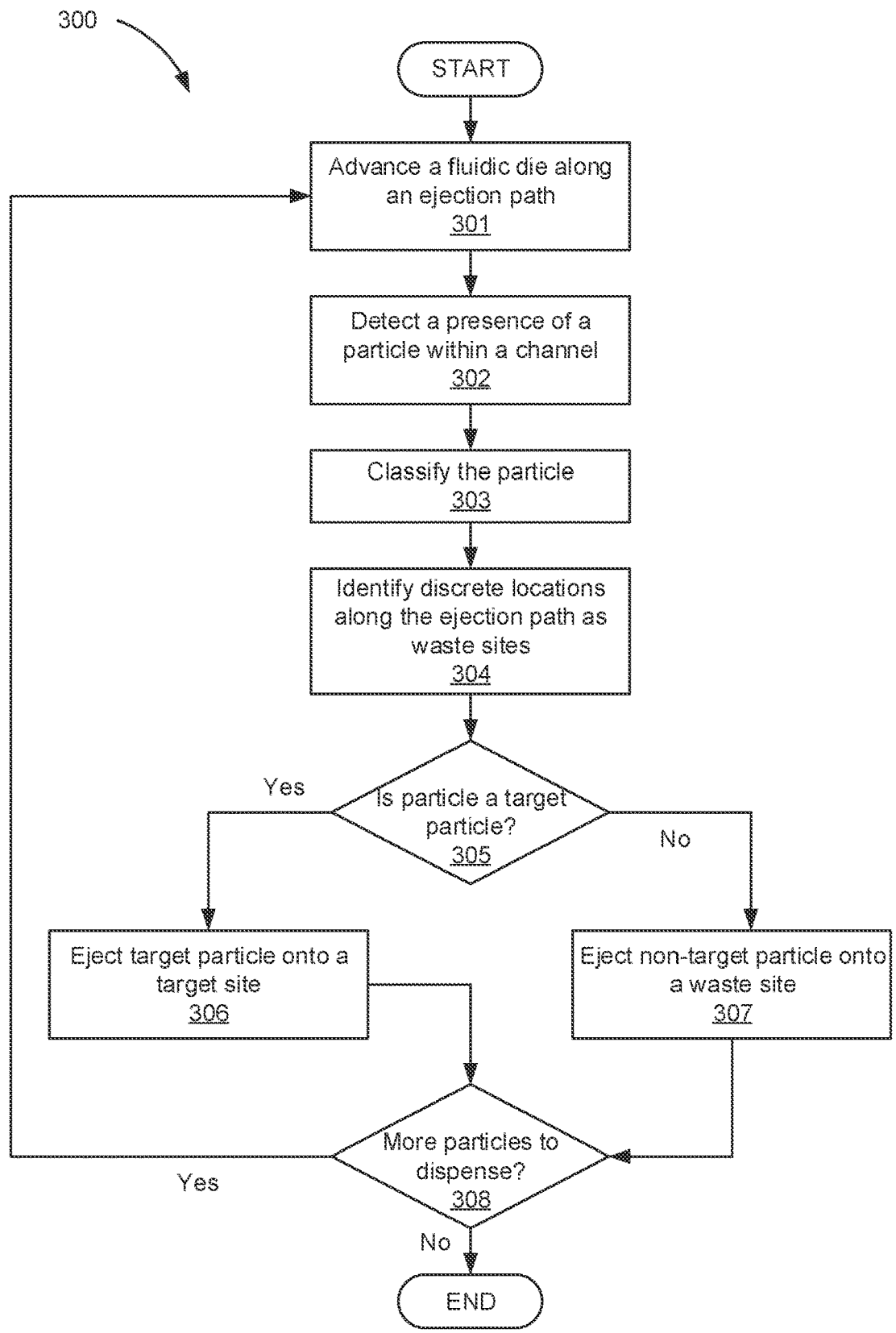
FIG. 3 is a flowchart of a method for identifying fluidic waste sites, according to an example of the principles described herein.

FIG. 3 is a flowchart of a method (300) for identifying fluidic waste sites, according to an example of the principles described herein. As described above, the controller (FIG. 1, 110) incrementally advances (block 301) the fluidic die (FIG. 1, 102) along the ejection path (FIG. 2, 214) either by moving the substrate (FIG. 2, 212) or moving the fluidic die (FIG. 1, 102).

The sensor (FIG. 1, 106) and controller (FIG. 1, 110) working together may detect (block 302) a presence of a particle, whether it is a non-target particle or a target particle, within the channel (FIG. 1, 104) and may classify (block 303) the particle as a target particle or a non-target particle. As described above, the detection may be based on any number of criteria including fluorescence, impedance, size, color etc. Accordingly, the sensor (FIG. 1, 106) may be selected so as to differentiate based on the criteria used and the controller (FIG. 1, 110) may process the sensor (FIG. 1, 106) output to identify the particle.

Also as described above, the controller (FIG. 1, 110) may identify (block 304) discrete locations along the ejection path (FIG. 2, 214) as waste sites. As described above, a waste site is associated with a non-target particle being detected within the channel (FIG. 1, 104) and such identification may occur as the fluidic die (FIG. 1, 102) advances along the ejection path (FIG. 2, 214). Again, rather than relying on previously defined waste sites which may be inefficiently positioned and may be of a quantity that does not match the sample fluid purity, the present method (300) allocates the waste sites as needed such that just enough waste sites are defined to complete dispensing of the target particles as intended.

As such, the controller (FIG. 1, 110) determines if the particle is a target particle (block 305). If the particle is a target particle (block 305, determination YES), the controller (FIG. 1,110) ejects (block 306) the target particle to a target site. Ejection may include movement of the substrate (FIG. 2, 212) such that the fluidic die (FIG. 1, 102) aligns with a next unoccupied discrete location along the ejection path (FIG. 2, 214) when the fluidic die (FIG. 1, 102) is not previously disposed over the next unoccupied discrete location.

If the particle is not a target particle (block 305, determination NO), the controller (FIG. 1, 110) ejects (block 307) the non-target particle to a waste site. Ejection may include movement of the substrate (FIG. 2, 212) such that the fluidic die (FIG. 1, 102) is aligned with a closest waste site when the fluidic die (FIG. 1, 102) is not previously disposed over a waste site.

In either case, i.e., detection of a non-target particle or a target particle, the method (300) includes determining (block 308) if there are more target particles to dispense, or more discrete locations along the ejection path (FIG. 2, 214). If so (block 308, determination YES), the method (300) returns to advance (block 301) the fluidic die (FIG. 1, 102) further along the ejection path (FIG. 2, 214). If there are no more discrete locations along the ejection path (FIG. 2, 214) (block 308, determination NO), the method (300) terminates.

Figure 4:
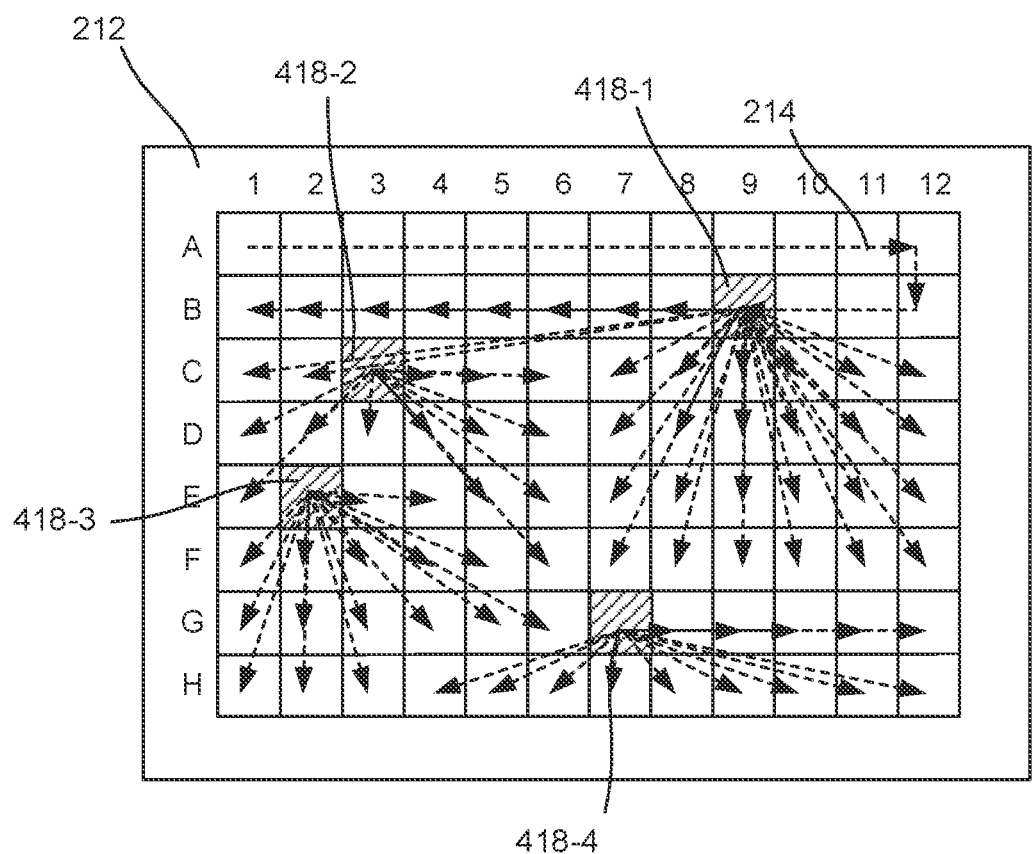
FIG. 4 is a diagram with a well plate with dynamically identified waste sites, according to an example of the principles described herein.

FIG. 4 is a diagram with a well plate (212) with dynamically identified waste sites (418), according to an example of the principles described herein. In FIG. 4, the waste sites (418) are depicted as cross-filled wells, whereas discrete locations that are target sites, i.e., sites where an intended predetermined volume or count of target particles has been deposited, are identified as un-filled wells.

As described above, the fluidic die (FIG. 1, 102) may be in two different modes depending on intended dispense characteristics. In the example depicted in FIG. 4, the fluidic die (FIG. 1, 102) may be in a high-occupancy mode where occupancy is prioritized over throughput. In this example, multiple waste sites (418) may be identified along the ejection path (214) and during subsequent ejection events, when a second, third, etc. non-target particle is identified, these non-target particles are ejected into one of the multiple waste sites (418) that are closest to the current position of the fluidic die (FIG. 1, 102). For example, for ejection into "C6", the shortest waste path may be from "C5" to "C3," which is the second waste site (418-2), then on to "C6" along the ejection path (214), such that detected non-target particles would be ejected into the second waste site (418-2). By comparison, for ejection into the next well along the ejection path (214), "C7", the shortest waste path may be from "C6" to "B9" (418-1) then on to "C7", such that detected non-target particles would be ejected into the first waste site (418-1).

As described above, the controller (FIG. 1, 110) may identify those discrete locations, e.g., wells, that are to be designated as waste sites. This may occur in a variety of ways. For example, the controller (FIG. 1, 110) may identify a first waste site (418-1) based on a detected non-target particle within the channel (FIG. 1, 104). That is, when the sensor (FIG. 1, 106) identifies a non-target particle, the controller (FIG. 1, 110) may designate the location of the fluidic die (FIG. 1, 102), relative to the well plate at which the identification is made, as a waste site (418). Accordingly, for subsequent events along the ejection path (214) until another waste site (418) is identified, when a non-target particle is identified, the fluidic die (FIG. 1, 102) may be moved and the non-target particle may be ejected into the first waste site (418-1).

The controller (FIG. 1, 110) may identify additional waste sites (418-2, 418-3, 418-4) based on a detected second particle in the channel (FIG. 1, 104) as another target particle is passing through the channel (FIG. 1, 104). Put another way, the additional waste sites (418-2, 418-3, 418-4) are identified when the sensor (FIG. 1, 106) detects something while clearing a target particle from the channel (FIG. 1, 104) into a target well. These additional wells are designated as waste sites (418) because there is uncertainty as to whether the particle that triggered the additional signal is also ejected into the well when clearing the channel (FIG. 1, 104). For example, while the ejection device (FIG. 1, 108) is clearing the channel (FIG. 1, 104) of a target particle into well "C3," a second target particle may be detected within the channel (FIG. 1, 104). It is therefore uncertain whether the second target particle is ejected into well "C3" or not. To ensure purity of the subsequent well, i.e., "C4," "C3" is designated as an additional waste site (418).

Upon identification of a subsequent non-target particle, the controller (FIG. 1, 110) is to determine a closest waste site (418) to a current position of the fluidic die (FIG. 1, 102) and the next well along the ejection path (214), and eject the non-target particle into that closest waste site (418). For example, when the fluidic die (FIG. 1, 102) is disposed over well "F8" with "F7" as the next well along the ejection path (214), the controller (FIG. 1, 110) may identify the first waste site (418-1) as the closest waste site and may eject any non-target particles detected to the first waste site (418-1). By comparison, when the fluidic die (FIG. 1, 102) is disposed over well "F7" with "F6" as the next well along the ejection path (214), the controller (FIG. 1, 110) may identify the second waste site (418-2) as the closest waste site and may eject any non-target particles detected to the second waste site (418-2). Still further, when the fluidic die (FIG. 1, 102) is disposed over well "F6" with "F5" as the next well along the ejection path (214), the controller (FIG. 1, 110) may identify the third waste site (418-3) as the closest waste site and may eject any non-target particles detected to the third waste site (418-3).

In an example, the detection and classification of a particle as a non-target particle or a target particle may occur prior to advancing along the ejection path (FIG. 2, 214). For example, following an ejection of a non-target particle at well "E2," or following ejection of a target particle at "E9," the substrate (FIG. 2, 212) may remain in place while a subsequent particle is classified. Based on the classification of the subsequent particle, the substrate (FIG. 2, 212) may advance such that the fluidic die (FIG. 2, 212) aligns with a next unoccupied discrete location along the ejection path (FIG. 2, 214) or the closest waste site (418).

In an example, the detection and classification of a particle as a non-target particle or a target particle may occur following advancement to a subsequent discrete location along the ejection path (FIG. 2, 214). For example, following an ejection of a non-target particle at well "E2," or following ejection of a target particle at "E9," the substrate (FIG. 2, 212) may move such that the fluidic die (FIG. 1, 102) aligns with a next unoccupied discrete location along the ejection path (FIG. 2, 214). Based on the classification of the subsequent particle, the substrate (FIG. 2, 212) may remain at the unoccupied discrete location or may move to align the fluidic die (FIG. 1, 102) with the closest waste site (418).

In summary, as depicted in FIG. 4, a method of identifying waste sites (418) may include 1) identifying a first waste site (418-1) based on a detected non-target particle in the channel (FIG. 1, 104), 2) identifying a second waste site (418-2) and additional waste sites based on a detected second target particle in the channel (FIG. 1, 104) as a first target particle is passing through the channel (FIGS. 1, 104); and 3) responsive to detecting a subsequent non-target particle, ejecting the subsequent non-target particle into a closest waste site of the first waste site (418-1) and the second waste site (418-2).

In one example, following ejection of a target particle, the substrate (FIG. 2, 212) may be moved such that the fluidic die (FIG. 1, 102) aligns with the closest waste site where a subsequent particle is classified as target or non-target. Responsive to identification of the subsequent particle as a target particle, the substrate (FIG. 2, 212) is moved such that the fluidic die (FIG. 1, 102) is no longer aligned with the waste site, but rather with a subsequent discrete location. In this position, the fluidic die (FIG. 1, 102) ejects the subsequent particle. Responsive to identification of the subsequent particle as a non-target particle, the subsequent particle is ejected to the closest waste site.

In another example, rather than moving to the closest waste site following ejection of a target particle, the substrate (FIG. 2, 212) is maintained at its current position such that the fluidic die (FIG. 2, 212) is over a current target site where a subsequent particle is classified as target or non-target. Responsive to identification of the subsequent particle as a target particle, the substrate (FIG. 2, 212) is moved such that the fluidic die (FIG. 1, 102) is no longer aligned with the current target site, but rather with a subsequent discrete location and the subsequent particle is ejected. Responsive to identification of the subsequent particle as a non-target particle, the substrate (FIG. 2, 212) is moved such that fluidic die (FIG. 1, 102) is aligned with the closest waste site where the non-target particle is ejected.

In yet another example, rather than moving to the closest waste site following ejection of a target particle, the substrate (FIG. 2, 212) is moved such that the fluidic die (FIG. 1, 102) is aligned with a subsequent discrete location where a subsequent particle is classified as target or non-target. Responsive to identification of the subsequent particle as a target particle, the fluidic die (FIG. 1, 102) is maintained over the subsequent discrete location and the subsequent particle is ejected. Responsive to identification of the subsequent particle as a non-target particle, the substrate (FIG. 2, 212) is moved such that the fluidic die (FIG. 1, 102) is aligned with the closest waste site where the non-target particle is ejected.

Figure 5:
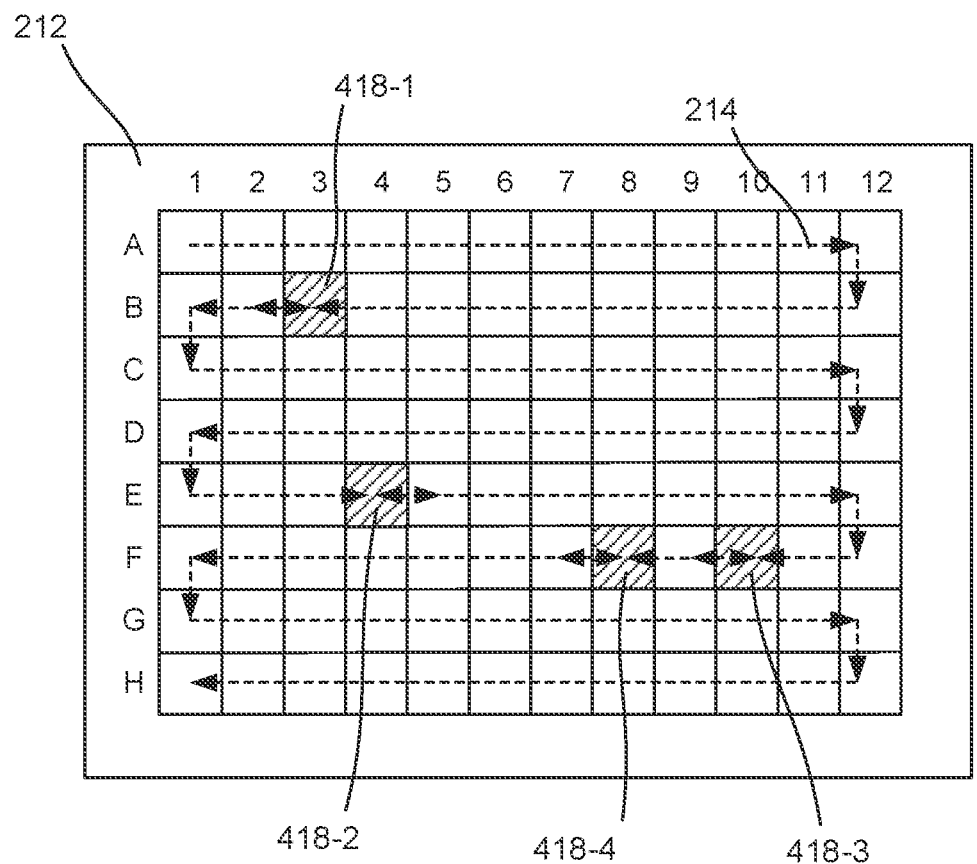
FIG. 5 is a diagram with a well plate with dynamically identified waste sites, according to an example of the principles described herein.

FIG. 5 is a diagram with a well plate (212) with dynamically identified waste sites (418), according to an example of the principles described herein. In the example depicted in FIG. 5, the fluidic die (FIG. 1, 102) may be in a high-speed mode where throughput is prioritized over occupancy. In this example, once a subsequent non-target particle is identified, rather than aligning the fluidic die (FIG. 1, 102) with a previously determined waste site (418), the controller (FIG. 1, 110) designates the well associated with the subsequent non-target particle as a second waste site (418-2).

For example, when the fluidic die (FIG. 1, 102) is disposed over the "E4" well, the sensor (FIG. 1, 106) may detect a non-target particle in the channel (FIG. 1, 104). Accordingly, rather than moving the substrate (FIG. 2, 212) to align the fluidic die (FIG. 1, 102) with well B3, i.e., a previously identified waste site (418), the controller (FIG. 1, 110) may designate well E4 as a waste site. In other words, wherein upon identification of the non-target particle, the controller (FIG. 1, 110) is to 1) designate a location of the substrate (FIG. 2, 212) over which the fluidic die (FIG. 1, 102) is found as the waste site, 2) eject the non-target particle, and 3) advance the fluidic die (FIG. 1, 102) to a subsequent discrete location along the ejection path (214).

By comparison, upon identification of the target particle, the controller (FIG. 1, 110) is to 1) designate a location of the substrate (FIG. 2, 212) over which the fluidic die (FIG. 1, 102) is found as a target site, 2) eject the target particle, and 3) advance the fluidic die (FIG. 1, 102) to a subsequent discrete location along the ejection path (214).

In one particular example, when a particular discrete location is designated as a waste site, the controller (FIG. 1, 110) uses that waste site as a staging area for a next discrete location. For example, after well "F10" has been designated as the third waste site (418-3), the fluidic die (FIG. 1, 102) remains over well "F10" and ejects until a target particle is identified, then the controller (FIG. 1, 110) moves the substrate (FIG. 2, 212) such that the fluidic die (FIG. 1, 102) is positioned over well "F9" for expulsion of the target particle. By comparison, when a non-target particle is identified while the fluidic die (FIG. 1, 102) is over well "F8", the controller (FIG. 1, 110), rather than move the substrate (FIG. 2, 212), may designate well "F8" as the fourth waste site (418-4).

Figure 6:
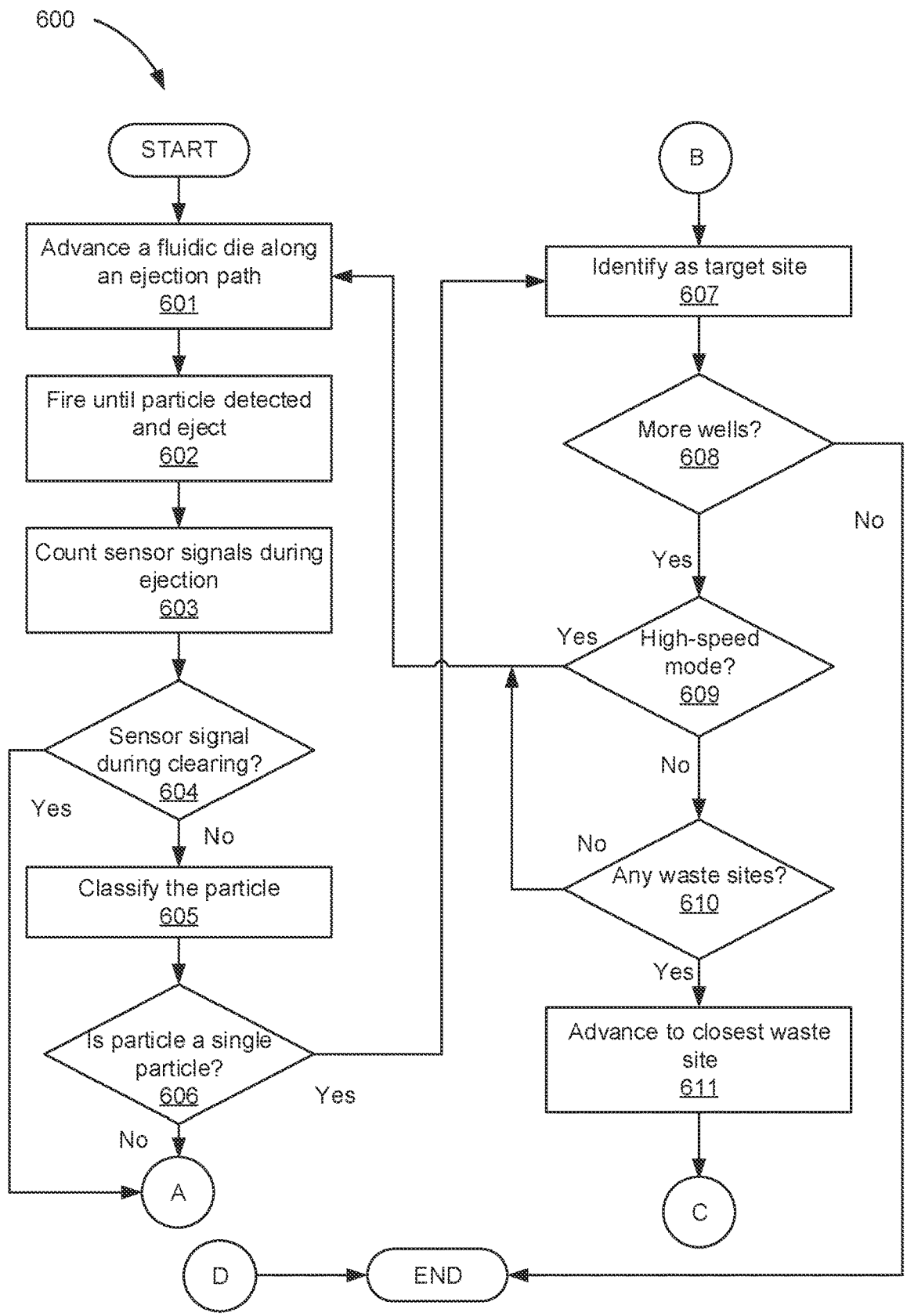
FIG. 6 is a flowchart of a method for identifying fluidic waste sites, according to an example of the principles described herein.

FIG. 6 is a flowchart of a method (600) for identifying fluidic waste sites (FIG. 4, 418), according to an example of the principles described herein. According to the method (600), a controller (FIG. 1, 110) advances (block 601) a fluidic die (FIG. 1, 102) along an ejection path (FIG. 2, 214). This may be performed as described above in connection with FIG. 3 by either moving the substrate (FIG. 2, 212) or moving the fluidic die (FIG. 1, 102).

The method (600) may include firing (block 602) until a target particle is detected and that target particle is ejected. That is, as described above a sample fluid may include particles dispersed throughout a carrier fluid. A sensed particle may trigger movement of the substrate (FIG. 2, 212). Accordingly, if no particle is detected the controller (FIG. 1, 110) may maintain the substrate (FIG. 2, 212) in its location.

While clearing the contents of the channel (FIG. 1, 104), the controller (FIG. 1, 110) may count (block 603) sensor (FIG. 1, 106) signals during ejection. If a sensor signal is detected during clearing (block 604, determination YES), the ejection may identify (block 612) the location as a waste site. If a sensor (FIG. 1, 106) signal is not detected during clearing (block 604, determination NO), the method (600) may continue by classifying (block 605) the particle as a target or non-target particle. This may be performed as described above in connection with FIG. 3.

The controller (FIG. 1, 110) may then determine (block 606) if the particle is a target particle, which in a particular example, is a single cell. If the particle is a target particle (block 606, determination YES), the controller (FIG. 1, 110) identifies (block 607) the location as a target site and ejects the target particle at this site. This may include transmitting a predetermined number of pulses following sensing of the target particle to eject the target particle. That is, it may be that a single fire pulse is not enough to empty the whole channel (FIG. 1, 104) contents. Accordingly, it may take multiple fire pulses to move the target particle out the nozzle. In some examples, the predetermined number of pulses may be 1, 5, 10, 20, or 30.

If the particle is not a target particle (block 606, determination NO), the controller (FIG. 1, 110) identifies (block 612) the location as a waste site and ejects the non-target particle at this waste site. Following ejection of the target particle at the target site or ejection of the non-target particle at the waste site (FIG. 4, 418), if there are no more wells to dispense into (block 608, determination NO), the method (600) ends.

If the particle is a single target particle (block 606, determination YES), and there are more wells to dispense into (block 608, determination YES), the controller (FIG. 1, 110) determines (block 609) whether the system (FIG. 1, 100) is operating in a high-speed mode. If so (block 609, determination YES), the controller (FIG. 1, 110) advances (block 601) the fluidic die (FIG. 1, 102) along the ejection path (FIG. 2, 214) and the method (600) repeats.

If the system (FIG. 1, 100) is not in a high-speed mode (block 609, determination NO), the controller (FIG. 1, 110) determines (block 610) if there are any previously runtime designated waste sites. If not (block 610, determination NO), the controller (FIG. 1, 110) advances (block 601) the fluidic die (FIG. 1, 102) along the ejection path (FIG. 2, 214) and the method (600) repeats. If there are previously identified waste sites (FIG. 4, 418) (block 610, determination YES), the controller (FIG. 1, 110) advances (block 611) the fluidic die (FIG. 1, 102) to the closest waste site (FIG. 4, 418).

Once over the closest waste site (FIG. 4, 418), the controller (FIG. 1, 110) fires (block 618) the ejection device (FIG. 1, 108) until a particle is detected and may immediately discontinue the ejection device (FIG. 1, 11) fire pulses. The controller (FIG. 1, 110) classifies (block 619) the particle as described above. If the particle is a single target particle (block 620, determination YES), the controller (FIG. 1, 110) advances (block 621) the fluidic die (FIG. 1, 102) to the next unoccupied discrete location and fires (block 622) the ejection device (FIG. 1, 108) until the target particle is ejected.

As described above, it may be the case that as the target particle is being ejected, another particle may enter the channel (FIG. 1, 104). Accordingly, the controller (FIG. 1, 110) may count (block 623) sensor (FIG. 1, 106) signals during target particle ejection. If it turns out that a signal count increases (block 624, determination YES), indicating a subsequent particle is detected by the sensor (FIG. 1, 106), this subsequent location may be identified (block 612) as a waste site and the method (600) continues. By comparison, if the signal count does not increase (block 624, determination NO), the controller (FIG. 1, 110) identifies (block 607) this discrete location as a target site and the method (600) continues.

If a particle detected is not a single target particle (block 606, determination NO) and there are more wells to eject into (block 613, determination YES), the controller (FIG. 1, 110) may count sensor (FIG. 1, 106) signals during ejection. If a sensor signal is detected during clearing (block 614, determination YES), the ejection may continue to fire (block 615) until the non-target particle is ejected. If a sensor (FIG. 1, 106) signal is not detected during clearing (block 614, determination NO), the method (600) may continue by continuing to fire (block 618) until a particle is detected and the method (600) may continue as described above.

Following ejection of a non-target particle, the controller (FIG. 1, 110) may count (block 616) sensor (FIG. 1, 106) signals during ejection. If a sensor signal is detected during clearing (block 617, determination YES), the ejection may continue to fire (block 615) until yet another particle is detected. If a sensor (FIG. 1, 106) signal is not detected during clearing (block 617, determination NO), the method (600) may continue by continuing to fire (block 618) until a particle is detected and the method (600) may continue as described above. Accordingly, the present specification describes a method (600) that efficiently and effectively ensures target particles, which in one particular example are single cells of a sample fluid, are ejected into wells of a well plate while those contaminants are effectively ejected into dynamically-assigned waste sites along the ejection path (FIG. 2, 214).

Figure 7:
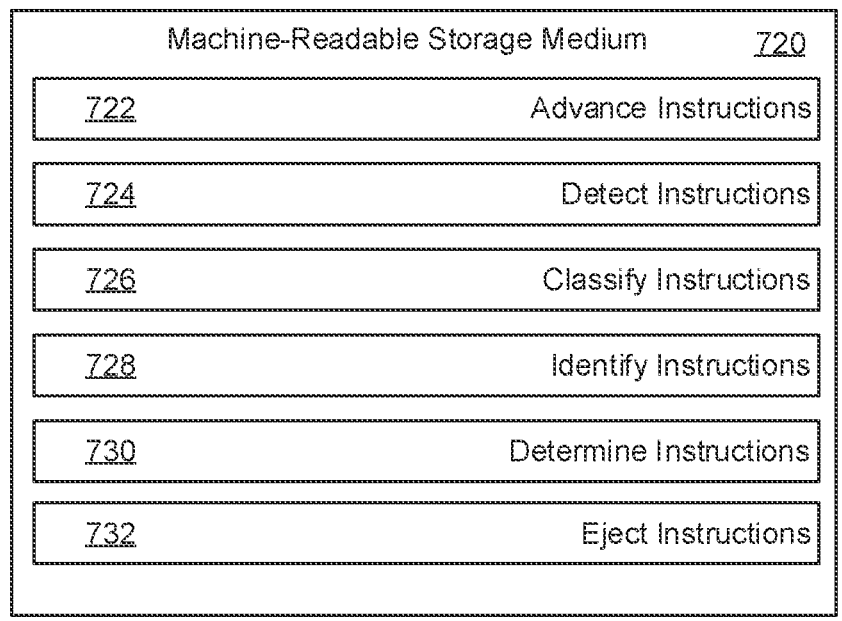
FIG. 7 depicts a non-transitory machine-readable storage medium for identifying fluidic waste sites, according to an example of the principles described herein.

FIG. 7 depicts a non-transitory machine-readable storage medium (720) for identifying fluidic waste sites (FIG. 4, 418), according to an example of the principles described herein. To achieve its desired functionality, the controller (FIG. 1, 110) includes various hardware components. Specifically, the controller (FIG. 1, 110) includes a processor and a machine-readable storage medium (720). The machine-readable storage medium (720) is communicatively coupled to the processor. The machine-readable storage medium (720) includes a number of instructions (722, 724, 726, 728, 730, 732) for performing a designated function. In some examples, the instructions may be machine code and/or script code.

The machine-readable storage medium (720) causes the processor to execute the designated function of the instructions (722, 724, 726, 728, 730, 732). The machine-readable storage medium (720) can store data, programs, instructions, or any other machine-readable data that can be utilized to operate the controller (FIG. 1, 110). Machine-readable storage medium (720) can store machine-readable instructions that the processor of the controller (FIG. 1, 110) can process, or execute. The machine-readable storage medium (720) can be an electronic, magnetic, optical, or other physical storage device that contains or stores executable instructions. Machine-readable storage medium (720) may be, for example, Random-Access Memory (RAM), an Electrically Erasable Programmable Read-Only Memory (EEPROM), a storage device, an optical disc, etc. The machine-readable storage medium (720) may be a non-transitory machine-readable storage medium (720).

Referring to FIG. 7, advance instructions (722), when executed by the processor, cause the processor to incrementally advance a fluidic die (FIG. 1, 102) along an ejection path (FIG. 2, 214) over a well plate (FIG. 2, 212) which has a number of wells. Detect instructions (724), when executed by the processor, cause the processor to, detect a presence of a particle within the channel (FIG. 1, 104). Classify instructions (726), when executed by the processor, cause the processor to, classify the particle as a target particle or a non-target particle. Identify instructions (728), when executed by the processor, cause the processor to, 1) identify a first well as a first waste site (FIG. 4, 418-1) based on a non-target particle in the channel (FIGS. 1, 104) and 2) identify a second well as a second waste site (FIG. 4, 418-2) based on a sensed second target particle as the first target particle is passing through the channel (FIG. 1, 104). Determine instructions (730), when executed by the processor, cause the processor to determine a closest waste site of the first waste site and the second waste site. Eject instructions (732), when executed by the processor, cause the processor to eject a target particle into a target well of the well plate responsive to identification of a target particle and eject a non-target particle to the closest waste site responsive to identification of a non-target particle.

In summary, using such a particle dispensing system 1) provides highly accurate particle separation; 2) allocates waste sites during the run and on demand so as to increase the number of usable wells, 3) allocates a quantity of waste sites commensurate with the quality of the sample fluid; 4) increases throughput by identifying a closest waste site into which non-target particles are ejected; 5) provides for the rapid generation of many singulated particles; and 6) avoids separate verification tools/operations. However, the devices disclosed herein may address other matters and deficiencies in a number of technical areas. However, the devices disclosed herein may address other matters and deficiencies in a number of technical areas.

What is claimed is:

1. A system, comprising:
a fluidic die configured to advance along an ejection path relative to a substrate, the fluidic die comprising:
a channel to contain a portion of a sample fluid;
a sensor to detect passage of a particle of the sample fluid into the channel; and
an ejection device to eject the particle; and
a controller configured to:
classify the particle as a target particle or a non-target particle;
identify, as the fluidic die advances along the ejection path, discrete locations of the substrate along the ejection path as waste sites;
upon identification of a target particle, eject the target particle to a target site of the substrate; and
upon identification of a non-target particle, eject the non-target particle to a waste site, wherein discrete locations of the substrate are dynamically identified as waste sites upon identification of the non-target particle.

2. The system of claim 1, wherein the controller is to identify a discrete location of the substrate as a first waste site based on a detected non-target particle in the channel.

3. The system of claim 2, wherein the controller is to identify additional waste sites based on a detected second particle as a target particle is passing through the channel.

4. The system of claim 3, wherein upon identification of the non-target particle, the controller is to:
   determine a closest waste site to a current position of the fluidic die; and
   eject the non-target particle into the closest waste site.

5. The system of claim 1, wherein upon identification of the non-target particle, the controller is to:
   designate a location of the substrate over which the fluidic die is found as the waste site;
   eject the non-target particle; and
   align the fluidic die with a subsequent discrete location along the ejection path.

6. The system of claim 5, wherein upon identification of the target particle, the controller is to:
   designate a location of the substrate over which the fluidic die is found as the target site;
   eject the target particle; and
   align the fluidic die with a subsequent discrete location along the ejection path.

\* \* \* \* \*